United States Patent
Li et al.

(10) Patent No.: US 11,765,548 B2
(45) Date of Patent: Sep. 19, 2023

(54) LOCATION INFORMATION MEASUREMENT IMPLEMENTATION METHOD, TERMINAL, AND ACCESS NETWORK ELEMENT

(71) Applicant: ZTE CORPORATION, Guangdong (CN)

(72) Inventors: Dapeng Li, Shenzhen (CN); He Huang, Shenzhen (CN); Shijun Chen, Shenzhen (CN); Yin Gao, Shenzhen (CN); Jianquan Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/038,968

(22) Filed: Sep. 30, 2020

(65) Prior Publication Data

US 2021/0092561 A1 Mar. 25, 2021

Related U.S. Application Data

(63) Continuation of application No. PCT/CN2019/072940, filed on Jan. 24, 2019.

(30) Foreign Application Priority Data

Apr. 3, 2018 (CN) .......................... 201810292079.8

(51) Int. Cl.
*H04W 4/029* (2018.01)
*H04W 4/80* (2018.01)
*H04W 76/27* (2018.01)
*H04W 24/10* (2009.01)
*H04W 64/00* (2009.01)

(52) U.S. Cl.
CPC ............ *H04W 4/029* (2018.02); *H04W 4/80* (2018.02); *H04W 24/10* (2013.01); *H04W 64/003* (2013.01); *H04W 76/27* (2018.02)

(58) Field of Classification Search
None
See application file for complete search history.

(56) References Cited

U.S. PATENT DOCUMENTS

2014/0128057 A1* 5/2014 Siomina ................ H04W 56/00 455/423
2021/0063522 A1* 3/2021 Rauhala ................ G01S 5/0252

FOREIGN PATENT DOCUMENTS

| CN | 102056126 A | 5/2011 |
|---|---|---|
| CN | 103024659 A | 4/2013 |
| CN | 103875272 A | 6/2014 |
| CN | 105393612 A | 3/2016 |

(Continued)

OTHER PUBLICATIONS

"3rd Generation Partnership Project; Technical Specification Group Radio Access Network; Study on Indoor Positioning Enhancements for UTRA and LTE (Release 13)," 3GPP Draft; TR 37857 V0.5.0-CLEAN, Cedex, France, Aug. 3, 2015 (82 pages).

(Continued)

*Primary Examiner* — Adolf Dsouza
(74) *Attorney, Agent, or Firm* — Foley & Lardner LLP (57) ABSTRACT

Provided are systems and methods for location information measurement. The location information measurement implementation method is applied to an access network element, and includes sending auxiliary positioning information to a terminal, where the auxiliary positioning information is used by the terminal for positioning measurement.

14 Claims, 6 Drawing Sheets

(56) References Cited

FOREIGN PATENT DOCUMENTS

| CN | 105429742 | A | | 3/2016 | |
|---|---|---|---|---|---|
| CN | 106231539 | A | | 12/2016 | |
| CN | 106550331 | A | | 3/2017 | |
| CN | 109565640 | A | * | 4/2019 | ............ H04L 63/08 |
| EP | 2 934 051 | A1 | | 10/2015 | |
| EP | 3 742 790 | A1 | | 11/2020 | |
| KR | 20150130768 | A | | 11/2015 | |
| WO | WO-2018/031308 | A1 | | 2/2018 | |

OTHER PUBLICATIONS

CMCC: "Consideration on Bluetooth/WLAN 1-15 measurement collection in MDT", 3GPP Draft; R2-1803770 (Revision of R2-1803224); 3GPP TSG-RAN WG2 Meeting #101; Athens, Greece; Feb. 26-Mar. 2, 2018 (6 pages).

Extended European Search Report on EP 19780717 dated May 7, 2021 (11 pages).

Huawei et al: "Analysis on measurement 1-15 procedures for WLAN and Bluetooth measurement collection in MDT", 3GPP Draft; R2-1802879; 3GPP TSG-RAN WG2 Meeting #101; Athens, Greece; Feb. 26-Mar. 2, 2018 (5 pages).

Kyocera: "Considerations for MDT with WLAN/BT measurements", 3GPP TSG-RAN WG2 #101; R2-1803426; Athens, Greece, Feb. 26, 2018 (5 pages).

ZTE Corporation et al., "Position Assistant information for Bluetooth/WLAN measurement collection in MDT," 3GPP TSG-RAN WG2 Meeting #101 bis; R2-1804459; Sanya, China, Apr. 16-20, 2018 (5 pages).

CMCC.: "Consideration on Bluetooth/WLAN Measurement Collection in MDT" 3GPP TSG-RAN WG2 Meeting #101 R2-1803224, Mar. 2, 2018 (Mar. 2, 2018), Athens, Greece (6 pages).

Huawei et al.: "Overview of WLAN and Bluetooth Measurement Collection in MDT" 3GPP TSG-RAN WG2 Meeting #101 R2-1802878, Mar. 2, 2018 (Mar. 2, 2018), Athens, Greece (5 pages).

International Search Report and Written Opinion for PCT Appl. No. PCT/CN2019/072940 dated Mar. 27, 2019 (with English translation, 8 pages).

First Office Action for CN Appl. No. 201810292079.8, dated Jul. 23, 2021 (8 pages).

CMCC, "Consideration on Bluetooth/WLAN measurement collection in MDT" 3GPP TSG-RAN WG2 meeting #101, R2-1803770, Mar. 2, 2018, Athens, Greece (8 pages).

First Office Action for JP Appl. No. 2020-554122, dated Dec. 6, 2022 (with English translation, 6 pages).

Kyocera, "Considerations for MDT with WLAN/BT measurements" 8GPP TSG-RAN WG2 #101, R2-1803426, Mar. 2, 2018, Athens, Greece (7 pages).

Kyocera, "Considerations for MDT with WLAN/BT measurements" 3GPP TSG-RAN WG2 #101, R2-1803426, Mar. 2, 2018, Athens, Greece (5 pages).

Third Office Action for CN Appl. No. 201810292079.8, dated Oct. 8, 2022 (with English translation, 15 pages).

* cited by examiner

LOCATION INFORMATION MEASUREMENT IMPLEMENTATION METHOD, TERMINAL, AND ACCESS NETWORK ELEMENT

CROSS-REFERENCE TO RELATED APPLICATIONS

This application claims the benefit of priority under 35 U.S.C. § 120 as a continuation of PCT Patent Application No. PCT/CN2019/072940, filed on Jan. 24, 2019, which claims priority to Chinese patent application No. 201810292079.8, filed on Apr. 3, 2018, disclosure of each of which is incorporated herein by reference in its entirety.

TECHNICAL FIELD

The present application relates to the field of wireless communications, for example, relates to a location information measurement method and an implementation method therefor, a terminal, and an access network element.

BACKGROUND

With the continuous development of communication technology, the Wireless Fidelity (Wifi) technology and the Bluetooth (BT) technology are widely used by people. The related Wifi technology and BT technology may be used as potential indoor positioning enhancement technologies for the 3rd Generation Partnership Project (3GPP) system.

The Wifi positioning system has been widely used for commercial positioning services (Location Based services, LBS). A User Equipment (UE) collects a received signal strength indication (RSSI) and other information of a positioning node (a Wifi node) using a Wifi receiver, and determines a location by means of a database of a location or coverage area of the positioning node. In the BT positioning system, the Bluetooth Low Energy (BLE) beacon is considered as a potential technology to provide location information and related context interaction for the UE. The BT beacon is a transmitter that broadcasts a BT signal using BLE. When the UE is in BT beacon proximity, the UE can acquire a BT beacon identifier (ID) and a BT beacon location can be acquired from a query of the database.

In order to reduce the cost and complexity for performing manual drive test by operators using dedicated equipment, the 3GPP starts to introduce a minimization of drive test (MDT) function in Release-10 of universal terrestrial radio access network (UTRAN) and evolved universal terrestrial radio access network (E-UTRAN) systems.

The MDT function automatically collects measurement information using a UE (or called terminal), reports the measurement information to a related network element of a radio access network (RAN) through control plane signaling, and then reports the measurement information to a trace collection entity (TCE) of an operation and maintenance system (OAM) through the RAN for network optimization, such as discovering and solving a network coverage problem. For a UTRAN system, the related network element of the RAN mainly refers to a radio network controller (RNC). For an E-UTRAN system, the related network element of the RAN mainly refers to an evolved Node B (eNB).

With the wide application of the Wifi technology and the BT technology, how to implement the indoor positioning or the MDT function supporting the indoor positioning by using the Wifi or BT technology is a technical problem to be solved.

SUMMARY

Embodiments of the present application provide a location information measurement method and an implementation method therefor, a terminal, and an access network element, which can save air interface resources and computing resources consumed in the positioning process.

The embodiments of the present application provide a location information measurement implementation method. The method is applied to an access network element and includes the step described below.

Auxiliary positioning information is sent to a terminal, where the auxiliary positioning information is used by the terminal for positioning measurement.

The embodiments of the present application provide a location information measurement method. The method is applied to a terminal and includes the steps described below.

Auxiliary positioning information sent by an access network element is received.

Positioning measurement is performed according to the auxiliary positioning information.

The embodiments of the present application provide an access network element.

The access network element includes a memory, a processor and a location information measurement implementation program stored in the memory and executable on the processor, where the location information measurement implementation program, when executed by the processor, implements the location information measurement implementation method described above.

The embodiments of the present application provide a terminal.

The terminal includes a memory, a processor and a location information measurement program stored in the memory and executable on the processor, where the location information measurement program, when executed by the processor, implements the location information measurement method described above.

The embodiments of the present application provide a computer-readable storage medium. The computer-readable storage medium is configured to store a location information measurement implementation program which, when executed by a processor, implements the location information measurement implementation method described above.

The embodiments of the present application provide a computer-readable storage medium. The computer-readable storage medium is configured to store a location information measurement program which, when executed by a processor, implements the location information measurement method described above.

DETAILED DESCRIPTION

Embodiments of the present application will be described hereinafter in detail with reference to the drawings. It is to be noted that if not in collision, the embodiments and features therein in the present application may be combined with each other.

Figure 1:
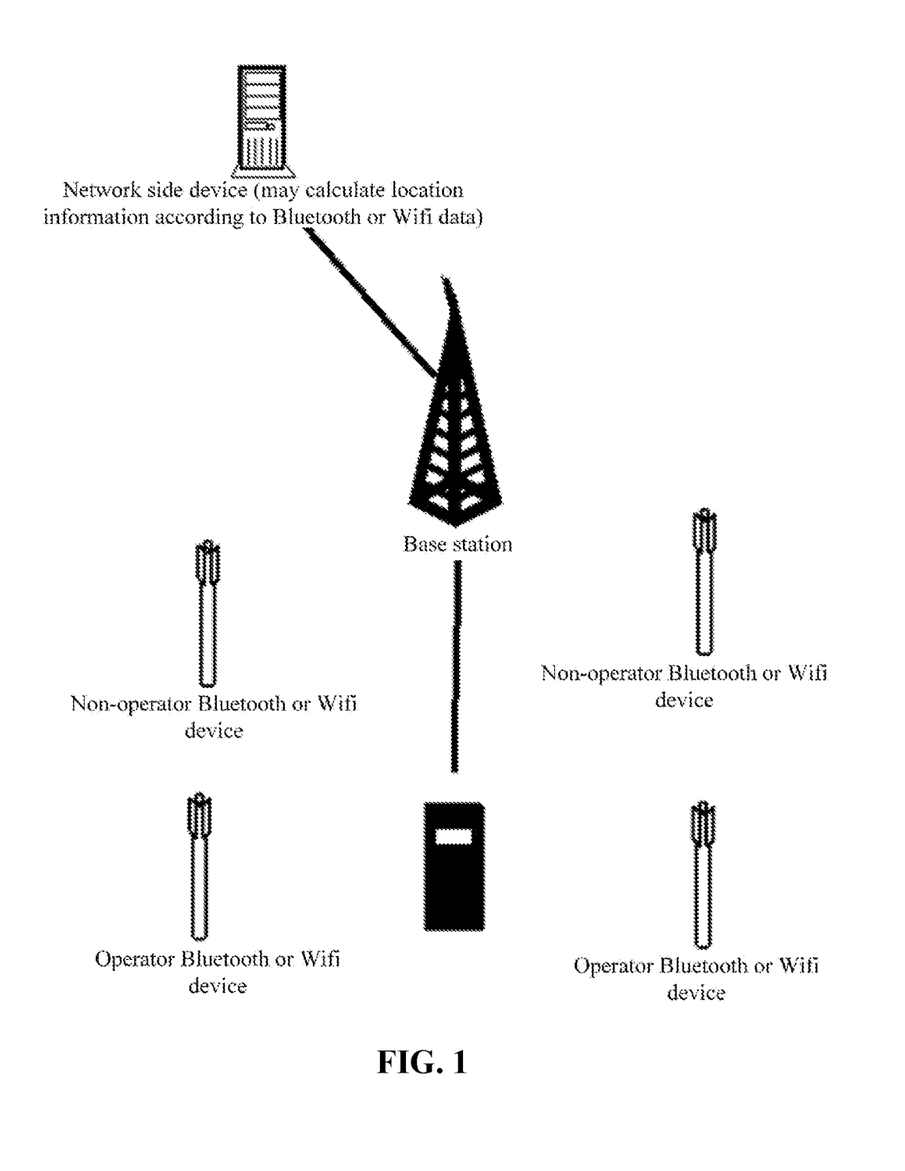
FIG. 1 is a structural diagram illustrating an indoor positioning system according to an embodiment of the present application.

FIG. 1 illustrates an indoor positioning system. Under a combination of a wireless communication system and the BT (or Wifi) positioning technology, a BT or Wifi positioning node device of an operator (or a third party delegated by the operator) is pre-deployed in a base station coverage area. A base station requires a terminal to implement measurement and report of the indoor positioning node through signaling configuration. When a terminal supporting indoor positioning moves to the vicinity of the positioning nodes, the terminal obtains and reports to the base station media access layer (media access control (MAC)) address information and signal strength information of these positioning nodes. After obtaining the information, the base station reports the information to a network device which is used for calculating the location.

The 3GPP starts to introduce the MDT function in Release-10 of UTRAN and E-UTRAN systems. The UTRAN includes a Node b and a radio network controller (RNC). The E-UTRAN includes an evolved node B (eNBs). A core network (CN) corresponding to the UTRAN includes a home subscriber server (HSS), a mobile switching center server (MSCS), a serving GPRS support node (SGSN), and the like. A CN corresponding to the E-UTRAN includes an HSS, a Mobile management entity (MME), and the like.

The MDT function is classified into a management-based MDT function and a signaling-based MDT function. The E-UTRAN system is used as an example herein, the activation process of the management-based MDT function is usually that includes that the operation and maintenance system, or called a network management system (operations administration and maintenance (OAM)), sends the eNB a trace session activation message containing MDT configuration information, and the eNB selects a suitable UE in an area specified by this message and sends the MDT configuration information to the selected UE. The activation process of the signaling-based MDT function is that the OAM sends to the HSS a trace session activation message containing MDT configuration information to the HSS to activate MDT measurement of an appointed UE, the HSS sends the MDT configuration information of the appointed UE to the MME, the MME sends the MDT configuration information of the appointed UE to the eNB, and the eNB finally sends the MDT configuration information to the appointed UE. During the activation process of the signaling-based MDT function, a certain UE is usually appointed by using an international mobile subscriber identity (IMSI) or an international mobile station equipment identity (IMEI), or the selection of UE is limited by adding area information. The trace session activation messages of the management-based MDT function and the signaling-based MDT function include the trace reference information from the OAM, the trace reference information includes public land mobile network (PLMN) information, which consists of a mobile country code (MCC) and a mobile network code (MNC).

When the terminal performs positioning measurement, in addition to the BT or Wifi positioning node device deployed by the operator indoors, there may be BT devices (e.g., vehicle-mounted or handheld terminals) supplied by the non-operator or privately configured Wifi devices indoors. The information of these non-operator BT devices or privately configured Wifi devices is not useful for calculating location information. In the related art, the terminal cannot distinguish between the operator BT/WiFi devices and the non-operator BT/WiFi devices and reports information of all proximity devices for measurement. Therefore, a large amount of invalid information will be carried in the measurement report. The invalid information will consume valuable air interface resources and waste positioning computing resources.

The technical solutions of the embodiments of the present application provide a location information measurement method and an implementation method therefor, where the terminal performs positioning measurement according to the requirements of the network side (e.g., screening of the positioning nodes), thereby saving air interface resources and computing resources consumed in the positioning measurement process.

Embodiment One

Figure 2:
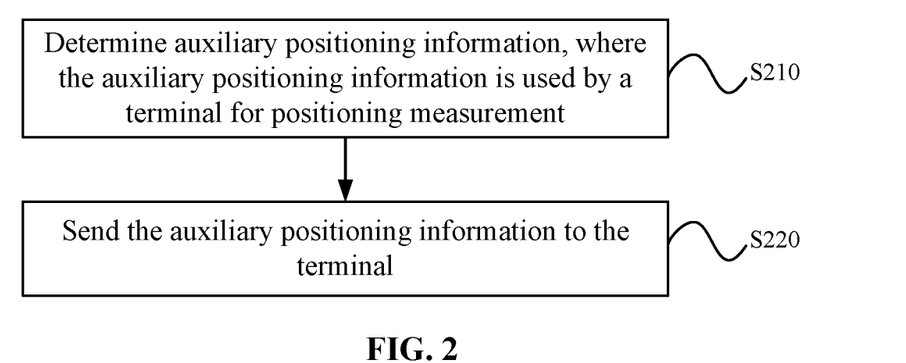
FIG. 2 is a flowchart of a location information measurement implementation method (an access network element) according to an embodiment one of the present application.

As shown in FIG. 2, this embodiment of the present application provides a location information measurement implementation method. The method is applied to an access network element and includes steps S210 and S220.

In step S210, auxiliary positioning information is determined.

The auxiliary positioning information is used by a terminal for positioning measurement.

In step S220, the auxiliary positioning information is sent to the terminal.

The embodiment of the present application provides the location information measurement method and the implementation method, the terminal, and the access network element. The access network element sends the auxiliary positioning information to the terminal, and the terminal performs positioning measurement according to the auxiliary positioning information. The technical solutions of the embodiments of the present application can save air interface resources and computing resources consumed in the positioning process.

In one embodiment, the positioning node includes a BT node or a Wifi node.

In one embodiment, the access network element includes a base station.

The base station may be an eNB or a gNB.

In one embodiment, the auxiliary positioning information includes at least one of the following information: information on a positioning node, a limit threshold for the number of positioning nodes reported by the terminal, and information on a valid positioning area.

The limit threshold for the number of positioning nodes reported by the terminal may include the maximum value of the number of positioning nodes reported by the terminal and the minimum value of the number of positioning nodes reported by the terminal; or only includes the maximum value of the number of positioning nodes reported by the terminal.

The information on the valid positioning area includes a valid tracking area (TA) list and a cell list.

In one embodiment, the auxiliary positioning information may further include filtering indication information. The filtering indication information is used to indicate whether the terminal filters positioning nodes. When the filtering indication information instructs the terminal to filter positioning nodes, the terminal filters out positioning nodes that do not meet an auxiliary positioning information requirement, and only reports detection information of positioning nodes that meet the auxiliary positioning information requirement or performs location calculation according to the detection information of the positioning nodes that meet the auxiliary positioning information requirement. When the filtering indication information instructs the terminal not to filter positioning nodes, the terminal reports detection information of all positioning nodes listened to by the terminal or performs location calculation according to the detection information of all positioning nodes listened to by the terminal.

In one embodiment, the information on the positioning node includes at least one of the following information: a media access control (MAC) address of the positioning node, a feature MAC address of the positioning node, a name of the positioning node, a feature name of the positioning node, a protocol version of the positioning node, an operating band of the positioning node, an operating channel of the positioning node, a signal strength of the positioning node, type information of the positioning node, and location information of the positioning node.

When the positioning node is a BT node (i.e., a BT device), the MAC address of the BT device may be a beacon identifier of 48 bits; considering that the MAC addresses of BT devices purchased by the operator deploying the BT devices may be continuous, some bits of the 48-bit MAC address may serve as the feature MAC address (specific part of the MAC address) of the BT device deployed by the operator, and such feature MAC address may be configured to the terminal as auxiliary positioning information for identifying the positioning node. For the name of the BT device, the operator may configure a unique name for each BT device. For the BT devices uniformly deployed by the operator, all the BT devices may be uniformly named, and the name feature field in such uniform naming may be used as a feature name (specific part of the name) of the BT device deployed by the operator. The operating frequency range of the BT device is 2400-2483.5 MHz, and the operating frequency of an operator-deployed BT device may be a part of that frequency range. The protocol version of the BT device may be Bluetooth protocol version 5 or other Bluetooth protocol versions. The BT frequency band can be divided into different bands, and the band information is used as the operating channel of the BT device. The signal strength of the BT device may be a received signal strength indication (RSSI) of the BT device received by the terminal. The type information of the BT device may include at least one of the following information: a Bluetooth protocol version, transmit power, antenna gain, and coverage.

When the positioning node is a Wifi node (i.e., a Wifi device), the MAC address of the Wifi device may be a basic service set identifier (BSSID) defined in the 3GPP protocol 36.305. The name of the Wifi device may be a service set identifier (SSID) defined in 3GPP protocol 36.305. The operator deploying Wifi devices may configure each Wifi device with a different name or configures a group of Wifi devices with the same name. For the feature name of the Wifi device, the operator deploying the Wifi devices may uniformly name the deployed Wifi devices, and the name feature field in such uniform naming may be used as the feature name (specific part of the name) of the Wifi device deployed by the operator. The type information of the Wifi device may include at least one of the following information: wireless protocol version (e.g., 802.11a/b/g/n/ac/ad, etc.), transmit power, antenna gain, and coverage. The version of the Wifi device may be 802.11a or other version. The location information of the Wifi device may be a wireless access point (AP) location defined in 3GPP protocol 36.355, which is used by the terminal for directly calculating the location.

In one embodiment, when the positioning node is the Wifi node, the information on the positioning node may further include a wireless local area network (WLAN) assistance data element (WADE). The WADE may be a WADE in the 3GPP protocol 36.355.

In one embodiment, the step of sending the auxiliary positioning information to the terminal includes that the access network element sends the auxiliary positioning information to the terminal through a system broadcast message.

In one embodiment, the step of determining the auxiliary positioning information includes that the access network element acquires the auxiliary positioning information from a core network element.

The interface between the access network element and the core network element is an S1 interface or an N2 interface.

In one embodiment, the core network element includes a location calculation center node (e.g., an enhanced serving mobile location center (E-SMLC) device), or a mobile management entity (MME).

In one embodiment, the step of determining the auxiliary positioning information includes that the access network element acquires the auxiliary positioning information from a network management device. The interface between the access network element and the network management device is a northbound interface.

In one embodiment, the step of determining the auxiliary positioning information includes that the access network element acquires the auxiliary positioning information from a neighbor base station device. The interface between the access network element and the neighbor base station is an X2 interface or an Xn interface.

In one embodiment, the step of determining the auxiliary positioning information includes that when the access network element includes a central unit (CU) and a distributed unit (DU), the DU acquires the auxiliary positioning information from the CU.

The step of sending the auxiliary positioning information to the terminal includes that when the access network element includes the CU and the DU, the DU sends the auxiliary positioning information to the terminal. The interface between the CU and the DU is an F1 interface.

In one embodiment, after the auxiliary positioning information is sent to the terminal, the method further includes that the access network element receives terminal positioning measurement information reported by the terminal, or the access network element receives terminal positioning calculation information reported by the terminal.

The terminal positioning measurement information is location measurement information obtained after the terminal performs measurement according to the auxiliary positioning information. The terminal positioning calculation information is position calculation result information obtained after the terminal performs measurement and location calculation according to the auxiliary positioning information.

In this embodiment, the access network element (the base station) sends the auxiliary positioning information to the terminal, where the auxiliary positioning information may instruct the terminal to filter positioning nodes. When the terminal only needs to perform positioning measurement according to the positioning node that meets the network side requirements, air interface resources and computing resources can be saved.

Embodiment Two

Figure 3:
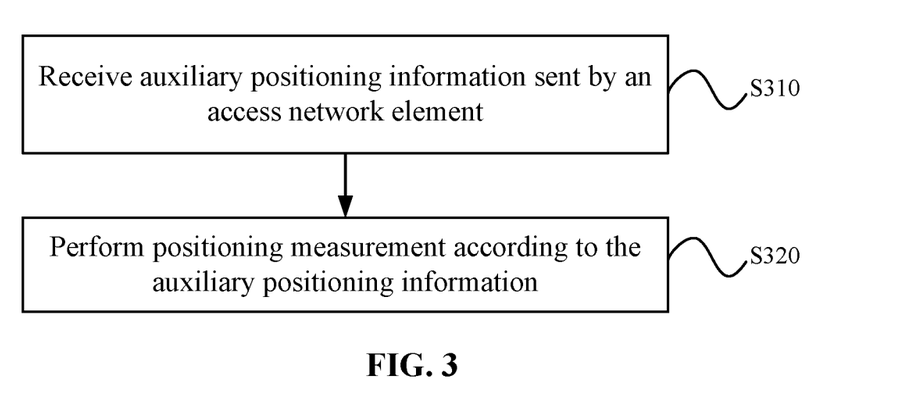
FIG. 3 is a flowchart of a location information measurement implementation method (a terminal) according to an embodiment two of the present application.

As shown in FIG. 3, this embodiment of the present application provides a location information measurement method. The method is applied to a terminal and includes steps S310 and S320.

In step S310, auxiliary positioning information sent by an access network element is received.

In step S320, positioning measurement is performed according to the auxiliary positioning information.

In one embodiment, the positioning node includes a BT node or a Wifi node.

In one embodiment, the access network element includes a base station.

The base station may be an eNB or a gNB.

In one embodiment, the auxiliary positioning information includes at least one of the following information: information on a positioning node, a limit threshold for the number of positioning nodes reported by the terminal, and information on a valid positioning area.

In one embodiment, the information on the positioning node includes at least one of the following information: an MAC address of the positioning node, a feature MAC address of the positioning node, a name of the positioning node, a feature name of the positioning node, a protocol version of the positioning node, an operating band of the positioning node, an operating channel of the positioning node, a signal strength of the positioning node, type information of the positioning node, and location information of the positioning node.

The limit threshold for the number of positioning nodes reported by the terminal may include the maximum value of the number of positioning nodes reported by the terminal and the minimum value of the number of positioning nodes reported by the terminal; or only includes the maximum value of the number of positioning nodes reported by the terminal.

The information on the valid positioning area includes a valid TA list and a cell list.

In one embodiment, the auxiliary positioning information may further include filtering indication information. The filtering indication information is used to indicate whether the terminal filters positioning nodes. When the filtering indication information instructs the terminal to filter positioning nodes, the terminal filters out positioning nodes that do not meet an auxiliary positioning information requirement, and only reports detection information of positioning nodes that meet the auxiliary positioning information requirement or performs location calculation according to the detection information of the positioning nodes that meet the auxiliary positioning information requirement. When the filtering indication information instructs the terminal not to filter positioning nodes, the terminal reports detection information of all positioning nodes listened to by the terminal or performs location calculation according to the detection information of all positioning nodes listened to by the terminal.

In one embodiment, the step of performing the positioning measurement according to the auxiliary positioning information includes the steps described below Positioning nodes are filtered according to the auxiliary positioning information, positioning nodes that do not meet an auxiliary positioning information requirement are filtered out, and positioning measurement is performed according to the positioning nodes obtained after filtering.

In this embodiment, after the terminal receives the auxiliary positioning information sent by the access network element (the base station), if the terminal monitors signals of multiple positioning nodes (including those deployed by or those not deployed by the operator), the terminal can filter all the monitored positioning nodes according to the auxiliary positioning information requirement to obtain positioning nodes that meet the auxiliary positioning information requirement (such as those useful for calculating the location), and the terminal measures the valid positioning nodes obtained after the filtering operation and reports the measurement result, thus saving air interface resources and computing resources.

Embodiment Three

Figure 4:
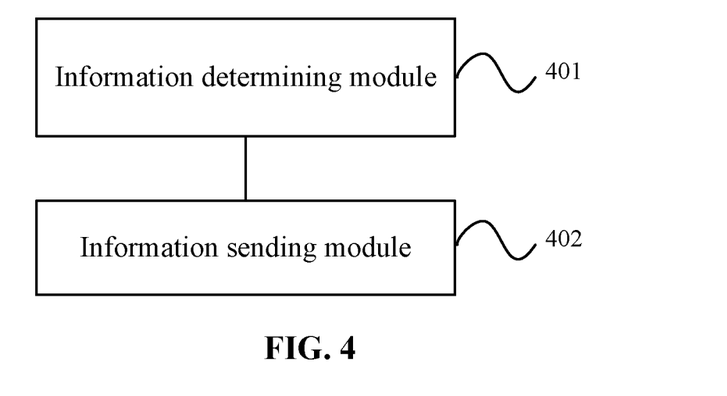
FIG. 4 is a structural diagram illustrating an access network element for location information measurement implementation according to an embodiment three of the present application.

As shown in FIG. 4, this embodiment of the present application provides an access network element. The access network element includes an information determining module 401 and an information sending module 402.

The information determining module 401 is configured to determine auxiliary positioning information, where the auxiliary positioning information is used by the terminal for positioning measurement.

The information sending module 402 is configured to send the auxiliary positioning information to the terminal.

In one embodiment, the auxiliary positioning information includes at least one of the following information: information on a positioning node, a limit threshold for the number of positioning nodes reported by the terminal, and information on a valid positioning area.

In one embodiment, the information on the positioning node includes at least one of the following information: an MAC address of the positioning node, a feature MAC address of the positioning node, a name of the positioning node, a feature name of the positioning node, a protocol version of the positioning node, an operating band of the positioning node, an operating channel of the positioning node, a signal strength of the positioning node, type information of the positioning node, and location information of the positioning node.

In an embodiment, the information sending module is configured to send the auxiliary positioning information to the terminal by using the following manner: sending the auxiliary positioning information to the terminal through location service (LCS) signaling or radio resource control RRC signaling.

In one embodiment, the information sending module is configured to send the auxiliary positioning information to the terminal by using the following manner: sending the auxiliary positioning information to the terminal through a system broadcast message.

In one embodiment, the information determining module is configured to determine the auxiliary positioning information by using the following manner: acquiring the auxiliary positioning information from a core network element; or acquiring the auxiliary positioning information from a network management device; or acquiring the auxiliary positioning information from a neighbor base station device.

In one embodiment, the positioning node includes a BT node or a Wifi node.

The access network element includes a base station.

Embodiment Four

Figure 5:
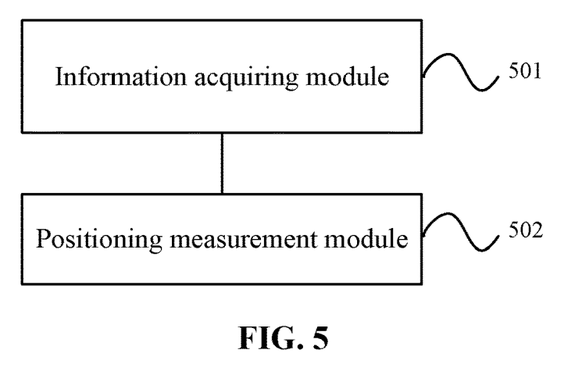
FIG. 5 is a structural diagram illustrating a terminal for location information measurement implementation according to an embodiment four of the present application.

As shown in FIG. 5, this embodiment of the present application provides a terminal. The terminal includes an information acquiring module 501 and a positioning measurement module 502.

The information acquiring module 501 is configured to receive auxiliary positioning information sent by an access network element.

The positioning measurement module 502 is configured to preform positioning measurement according to the auxiliary positioning information.

In one embodiment, the positioning node includes a BT node or a Wifi node.

In one embodiment, the access network element includes a base station.

The base station may be an eNB or a gNB.

In one embodiment, the auxiliary positioning information includes at least one of the following information: information on a positioning node, a limit threshold for the number of positioning nodes reported by the terminal, and information on a valid positioning area.

In one embodiment, the information on the positioning node includes at least one of the following information: an MAC address of the positioning node, a feature MAC address of the positioning node, a name of the positioning node, a feature name of the positioning node, a protocol version of the positioning node, an operating band of the positioning node, an operating channel of the positioning node, a signal strength of the positioning node, type information of the positioning node, and location information of the positioning node.

In one embodiment, the positioning measurement module is configured to preform positioning measurement according to the auxiliary positioning information by using the following manner: filtering positioning nodes according to the auxiliary positioning information, where positioning nodes that do not meet an auxiliary positioning information requirement are filtered out; and performing positioning measurement according to the positioning nodes obtained after the filtering.

Embodiment Five

This embodiment of the present application provides an access network element.

The access network element includes a memory, a processor and a location information measurement implementation program stored in the memory and executable on the processor, where the location information measurement implementation program, when executed by the processor, implements the location information measurement implementation method described in Embodiment one.

Embodiment Six

This embodiment of the present application provides a terminal.

The terminal includes a memory, a processor and a location information measurement program stored in the memory and executable on the processor, where the location information measurement program, when executed by the processor, implements the location information measurement method described in Embodiment two.

Embodiment Seven

This embodiment of the present application provides a computer-readable storage medium. The computer-readable storage medium is configured to store a location information measurement implementation program which, when executed by a processor, implements the location information measurement implementation method described in Embodiment one.

Embodiment Eight

This embodiment of the present application provides a computer-readable storage medium. The computer-readable storage medium is configured to store a location information measurement program which, when executed by a processor, implements the location information measurement method described in Embodiment two.

It will be understood by those of ordinary skill in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be implemented jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those of ordinary skill in the art, the term, computer storage medium, includes volatile and nonvolatile, removable and non-removable media implemented in any method or technology for storing information (such as computer-readable instructions, data structures, program modules or other data). The computer storage medium include, but is not limited to, a random access memory (RAM), a read-only memory (ROM), an electrically erasable programmable read-only memory (EE-PROM), a flash memory, or other memory technologies, a compact disc read-only memory (CD-ROM), a digital versatile disc (DVD) or other optical disc storage, a magnetic cassette, a magnetic tape, disk storage or other magnetic storage apparatus, or any other medium used to store the desired information and accessible by a computer. In addition, as is known to those of ordinary skill in the art, the communication medium generally includes computer-readable instructions, data structures, program modules or other data in modulated data signals such as carriers or other transmission mechanisms, and may include any information delivery medium.

The location information measurement method and an implementation method therefor of the present application are further described below using the following examples.

Example One

In this example, the terminal is a terminal supporting the location service (LCS), and the base station is an eNB or a gNB. In a terminal-assisted positioning mode scenario, the base station acquires auxiliary positioning information from a location calculation center node (e.g., an E-SMLC device), and sends the information to the terminal.

Figure 6:
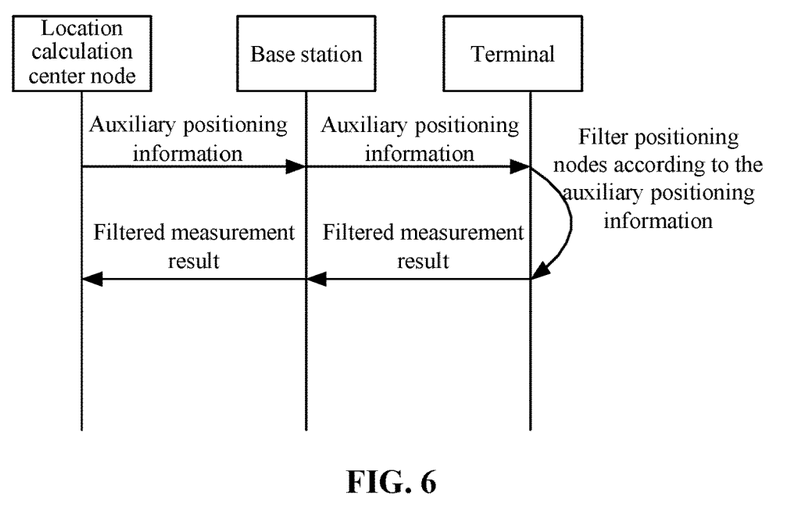
FIG. 6 is a schematic diagram illustrating information interaction of a location information measurement implementation method according to an example one of the present application.

As shown in FIG. 6, this example provides a location information measurement method. The method includes steps 1 to 4.

In step 1, the location calculation center node sends the auxiliary positioning information to the terminal through the base station.

In step 2, the terminal filters positioning nodes according to the auxiliary positioning information.

For example, some operators may uniformly name deployed BT nodes or Wifi nodes whose device names have specific character strings that are features of the positioning node devices.

When the terminal searches for the BT device or Wifi device, some BT devices or Wifi devices can be filtered out according to the character string feature. Therefore, the terminal does not report measurement information of irrelevant BT devices or Wifi devices any more.

Sometimes, for other needs of the operator, the operator also wants the terminal to report more complete information, such as all data detectable in the network. In this case, when the terminal can be instructed in the positioning auxiliary information to search for BT devices or Wifi devices that do not match device features in the positioning auxiliary information, the measurement and the report are also performed for the BT devices or Wifi devices that do not match the device features.

In step 3, the terminal reports the filtered measurement result to the location calculation center node through the base station.

In step 4, the location calculation center node calculates a location of the terminal.

In other embodiments, if the base station supports a CU-DU architecture, the CU may configure the auxiliary positioning information to the DU, and the DU may also configure the auxiliary positioning information to the CU.

In other embodiments, after a terminal in a connected state accesses a source base station, the terminal obtains the auxiliary positioning information from LCS signaling or RRC signaling. When the terminal in a connected state moves to a target base station, the terminal obtains the updated auxiliary positioning information from the LCS signaling or RRC signaling, and the terminal filters positioning nodes according to the updated auxiliary positioning information to perform location measurement.

Example Two

In this example, the terminal is a terminal supporting the LCS, and the base station is an eNB or a gNB. In a terminal-assisted positioning mode scenario, the terminal requests auxiliary positioning information from a location calculation center node (e.g., an E-SMLC device) through the base station, and the base station acquires the auxiliary positioning information from the location calculation center node (e.g., an E-SMLC device) and sends the information to the terminal.

Figure 7:
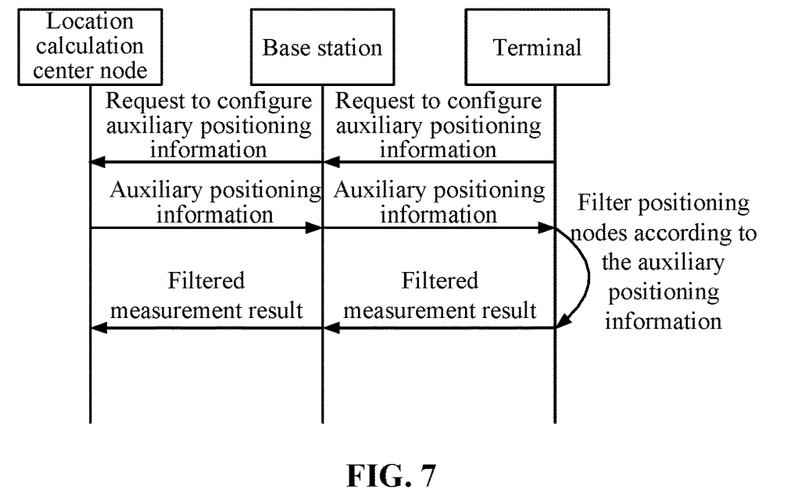
FIG. 7 is a schematic diagram illustrating information interaction of a location information measurement implementation method according to an example two of the present application.

As shown in FIG. 7, this example provides a location information measurement method. The method includes steps 1 to 5.

In step 1, the terminal requests the location calculation center node to configure auxiliary positioning information through the base station.

The terminal can carry addition information when requesting to configure the auxiliary positioning information, and the location calculation center node can determine auxiliary positioning information according to the addition information.

For example, the terminal can include frequency band information that the terminal wants to monitor in the addition information. After receiving the additional information, the location calculation center node can take the frequency band or related frequency bands reported by the terminal as the positioning auxiliary information, and sends the information to the terminal.

In step 2, the location calculation center node sends the auxiliary positioning information to the terminal through the base station.

In step 3, the terminal filters positioning nodes according to the auxiliary positioning information.

In step 4, the terminal reports the filtered measurement result to the location calculation center node through the base station.

In step 5, the location calculation center node calculates a location of the terminal.

Example Three

In this example, the terminal is a terminal supporting a logged MDT function, and the base station is an eNB or a gNB. In a terminal-assisted positioning mode scenario, the base station configures logged-type MDT measurement configuration information for the terminal, where the measurement configuration information includes auxiliary positioning information.

Figure 8:
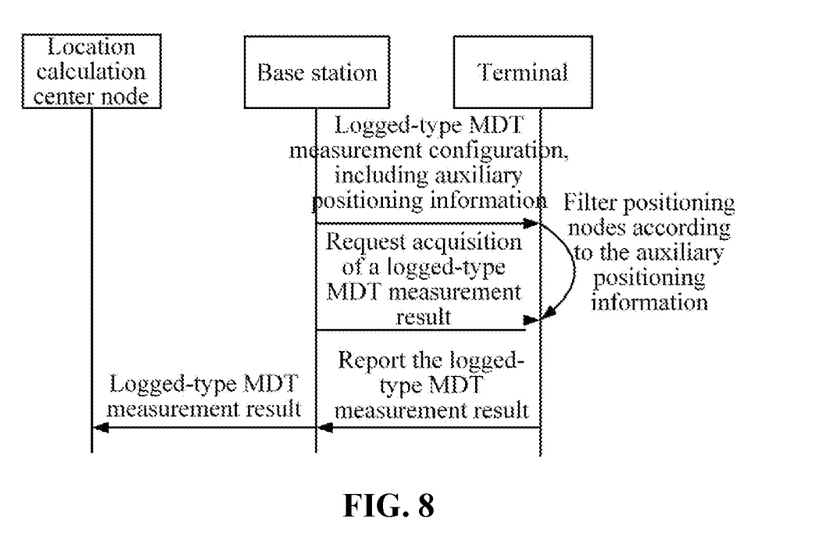
FIG. 8 is a schematic diagram illustrating information interaction of a location information measurement implementation method according to an example three of the present application.

As shown in FIG. 8, this example provides a location information measurement method. The method includes steps 1 to 5.

In step 1, the base station configures logged-type MDT measurement configuration information for the terminal, where the logged-type MDT measurement configuration information includes auxiliary positioning information.

In step 2, the terminal filters positioning nodes according to the auxiliary positioning information.

In step 3, the base station requests acquisition of a logged-type MDT measurement result.

The base station can request acquisition of the logged-type MDT measurement result by sending a UE information request message to the terminal.

In step 4, the terminal reports the logged-type MDT measurement result to the base station.

The terminal can carry the logged-type MDT measurement result by sending a UE information response message to the base station.

In step 5, the base station reports the measurement result to the location calculation center node for calculating a terminal location.

Example Four

In this example, the base station is an eNB or a gNB. In a terminal-assisted positioning mode scenario, the base station uses an immediate MDT manner to perform measurement, and the base station configures radio resource management (RRM) measurement configuration information for the terminal, where the RRM measurement configuration information includes auxiliary positioning information.

Figure 9:
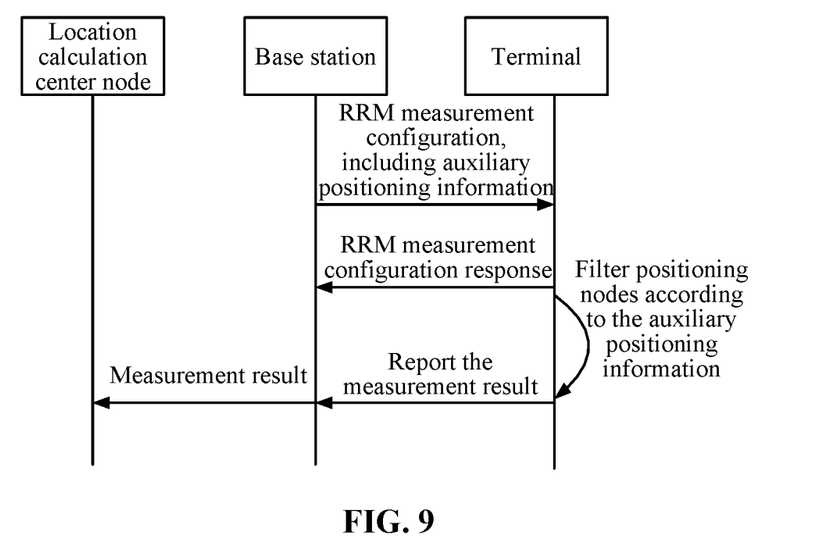
FIG. 9 is a schematic diagram illustrating information interaction of a location information measurement implementation method according to an example four of the present application.

As shown in FIG. 9, this example provides a location information measurement method. The method includes steps 1 to 5.

In step 1, the base station configures RRM measurement configuration information for the terminal, where the RRM measurement configuration information includes auxiliary positioning information.

The base station can perform RRC measurement configuration by sending an RRC connection reconfiguration message to the terminal.

In step 2, the terminal returns an RRM measurement configuration response to the base station.

The terminal can perform RRM measurement configuration by sending an RRC connection reconfiguration complete message to the base station.

In step 3, the terminal filters positioning nodes according to the auxiliary positioning information.

In step 4, the terminal reports a measurement result to the base station.

The terminal can carry the measurement result by sending a measurement report message to the base station.

In step 5, the base station reports the measurement result to the location calculation center node for calculating a terminal location.

In other embodiments, after a terminal in the connected state accesses a source base station, the terminal obtains the auxiliary positioning information from the LCS signaling or RRC signaling. When the terminal in the connected state moves to a target base station, the terminal obtains updated auxiliary positioning information from the LCS signaling or RRC signaling, and the terminal filters positioning nodes according to the updated auxiliary positioning information to perform location measurement.

Example Five

In this example, the base station is an eNB or a gNB. In a terminal-assisted positioning mode scenario, the signaling-based MDT function is used between the base station and the terminal. The base station acquires signaling-based MDT measurement configuration from a core network element, i.e., MME, where the signaling-based MDT measurement configuration includes auxiliary positioning information, and the base station sends the signaling-based MDT measurement configuration to the terminal. In other embodiments, the core network element may also be an authentication management function (AMF).

Figure 10:
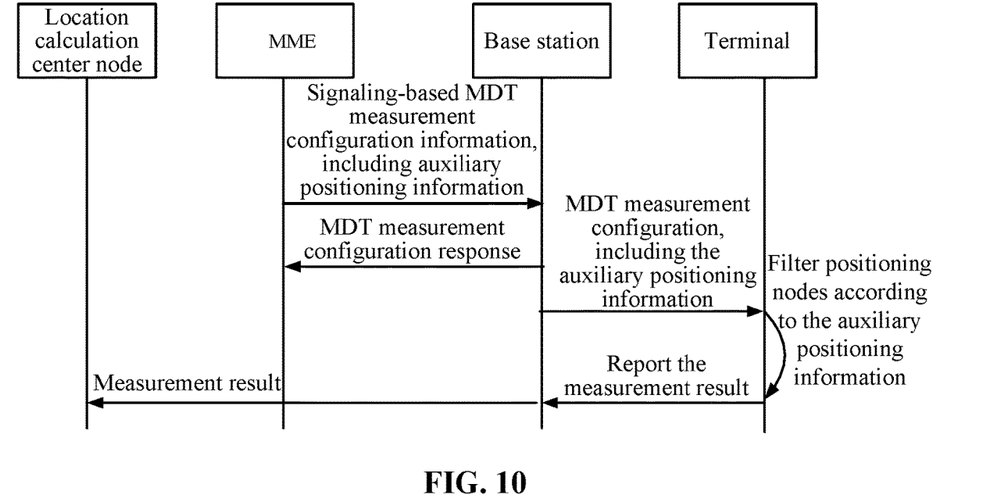
FIG. 10 is a schematic diagram illustrating information interaction of a location information measurement implementation method according to an example five of the present application.

As shown in FIG. 10, this example provides a location information measurement method. The method includes steps 1 to 6.

In step 1, the MME sends signaling-based MDT measurement configuration information to the base station, where the signaling-based MDT measurement configuration includes auxiliary positioning information.

An S1 interface message or an N2 interface message may be used between the MME and the base station for MDT measurement configuration.

In step 2, the base station returns an MDT measurement configuration response to the MME.

In step 3, the base station configures the terminal for MDT measurement, where the configuration information includes the auxiliary positioning information.

In step 4, the terminal filters positioning nodes according to the auxiliary positioning information.

In step 5, the terminal reports an MDT measurement result to the base station.

In step 6, the base station reports the MDT measurement result to the location calculation center node for calculating a terminal location.

Example Six

In this example, the base station is an eNB or a gNB. In a terminal-assisted positioning mode scenario, the management-based MDT function is used between the base station and the terminal. The base station acquires management-based MDT measurement configuration from a network management device, where the management-based MDT measurement configuration includes auxiliary positioning information, and sends the management-based MDT measurement configuration to the terminal.

Figure 11:
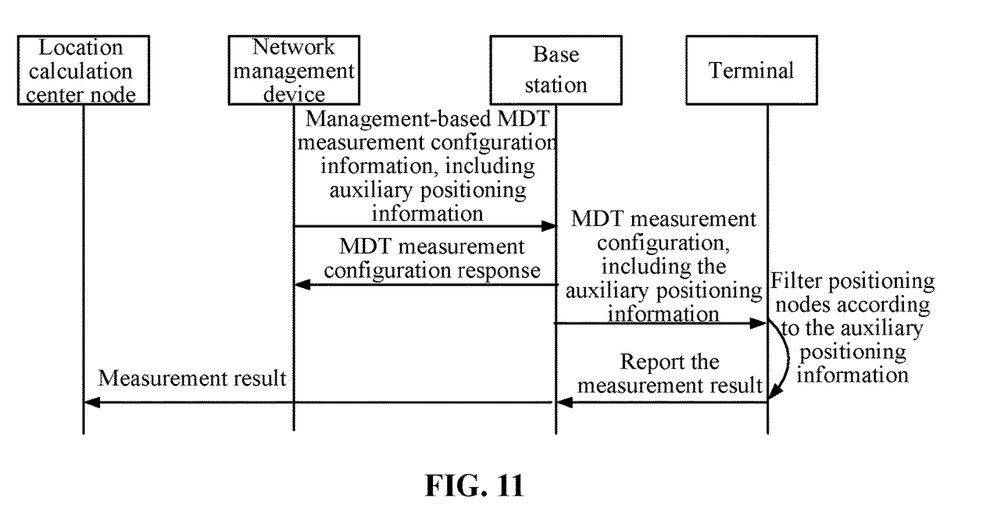
FIG. 11 is a schematic diagram illustrating information interaction of a location information measurement implementation method according to an example six of the present application.

As shown in FIG. 11, this example provides a location information measurement method. The method includes steps 1 to 6.

In step 1, the network management device sends management-based MDT measurement configuration information to the base station, where the management-based MDT measurement configuration information includes auxiliary positioning information.

A northbound interface message may be used between the network management device and the base station for MDT measurement configuration.

In step 2, the base station returns an MDT measurement configuration response to the network management device.

In step 3, the base station configures the terminal for MDT measurement, where the configuration information includes the auxiliary positioning information.

In step 4, the terminal filters positioning nodes according to the auxiliary positioning information.

In step 5, the terminal reports an MDT measurement result to the base station.

In step 6, the base station reports the MDT measurement result to the location calculation center node for calculating a terminal location.

Example Seven

In this example, the base station 1 is an eNB or a gNB, and the base station 2 is also an eNB or a gNB. In a terminal-assisted positioning mode scenario, the base station 2 acquires auxiliary positioning information from a neighbor base station (e.g., the base station 1) and sends the auxiliary positioning information to the terminal.

Figure 12:
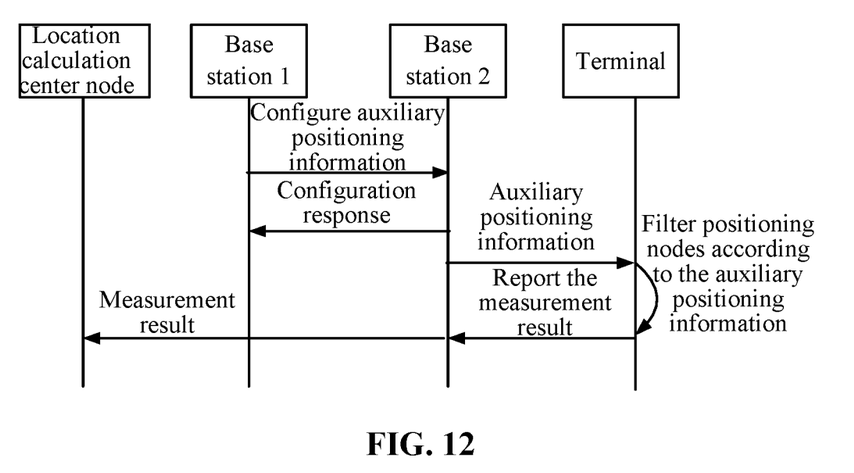
FIG. 12 is a schematic diagram illustrating information interaction of a location information measurement implementation method according to an example seven of the present application.

As shown in FIG. 12, this example provides a location information measurement method. The method includes steps 1 to 6.

In step 1, the base station 1 sends auxiliary positioning information the base station 2.

The base station 1 and the base station 2 are neighbor base stations, and an X2 interface message or an Xn interface message may be used between the base station 1 and the base station 2 to transmit the auxiliary positioning information.

In step 2, the base station 2 returns a configuration response to the base station 1.

In step 3, the base station 2 stores the auxiliary positioning information, and sends the auxiliary positioning information to the terminal.

In step 4, the terminal filters positioning nodes according to the auxiliary positioning information.

In step 5, the terminal reports a measurement result to the base station 2.

In step 6, the base station 2 reports the measurement result to the location calculation center node for calculating a terminal location.

Example Eight

In this example, the base station is an eNB or a gNB. In a terminal positioning mode (the terminal independently calculates location information) scenario, the base station sends auxiliary positioning information to the terminal, where the auxiliary positioning information includes location information of a positioning node.

Figure 13:
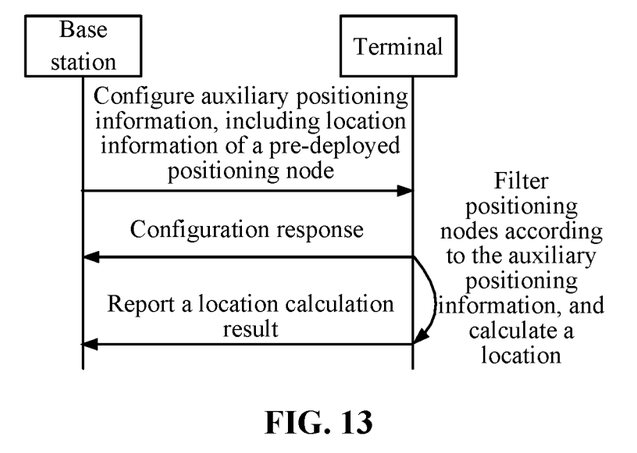
FIG. 13 is a schematic diagram illustrating information interaction of a location information measurement implementation method according to an example eight of the present application.

As shown in FIG. 13, this example provides a location information measurement method. The method includes steps 1 to 4.

In step 1, the base station sends auxiliary positioning information to the terminal, where the auxiliary positioning information includes location information of a pre-deployed positioning node.

A message carrying the auxiliary positioning information may be an LCS configuration message which may be an RRC connection reconfiguration message or a logged measurement configuration message configured by the base station.

In step 2, the terminal returns a configuration response to the base station.

In step 3, the terminal filters positioning nodes according to the auxiliary positioning information, and performs location measurement and calculation according to the filtered positioning node to obtain a location calculation result of the terminal.

In step 4, the terminal reports to the base station the location calculation result of the terminal.

Example Nine

In this example, the base station is an eNB or a gNB. In a terminal-assisted positioning mode scenario, auxiliary positioning information is carried between the base station and the terminal through a system broadcast message.

Figure 14:
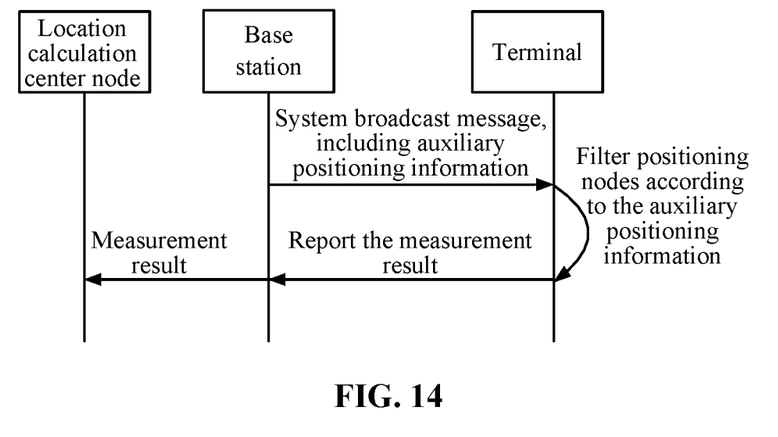
FIG. 14 is a schematic diagram illustrating information interaction of a location information measurement implementation method according to an example nine of the present application.

As shown in FIG. 14, this example provides a location information measurement method. The method includes steps 1 to 4.

In step 1, the base station sends a system broadcast message to the terminal, where the system broadcast message includes auxiliary positioning information.

In step 2, the terminal filters positioning nodes according to the auxiliary positioning information.

In step 3, the terminal reports a measurement result to the base station.

In step 4, the base station reports the measurement result to the location calculation center for calculating a terminal location.

In other embodiments, when a terminal in an idle state resides in a source base station or a terminal in a connected state accesses the source base station, the terminal may obtain auxiliary positioning information from the system broadcast message. After the terminal in the idle or connected state moves to a target base station, the terminal can obtain the updated auxiliary positioning information from the system broadcast message. The terminal filters positioning nodes according to the updated auxiliary positioning information and performs location measurement.

What is claimed is:

1. A location information measurement implementation method, applied to an access network element, comprising:
sending auxiliary positioning information to a terminal, wherein the auxiliary positioning information is suitable for positioning measurement by the terminal;
receiving, from the terminal, positioning measurement information of the terminal;
wherein the auxiliary positioning information comprises information on a positioning node,
the positioning node comprises a Bluetooth node; and
the information on the positioning node comprises a name of the Bluetooth node;
wherein the auxiliary positioning information comprises filtering indication information, the filtering indication information indicating that Bluetooth nodes whose device names lack specific character strings are filtered out by the terminal,
wherein the auxiliary positioning information further comprises a limit threshold for a number of positioning nodes to be reported by the terminal.

2. The location information measurement implementation method of claim 1, wherein sending the auxiliary positioning information to the terminal comprises:
sending the auxiliary positioning information to the terminal through radio resource control (RRC) signaling.

3. The location information measurement implementation method of claim 2, wherein sending the auxiliary positioning information to the terminal comprises:
sending the auxiliary positioning information to the terminal through a system broadcast message.

4. An access network element, comprising:
a memory, a processor and a location information measurement implementation program stored in the memory and executable on the processor, wherein the location information measurement implementation program, when executed by the processor, implements the location information measurement implementation method of claim 2.

5. An access network element, comprising:
a memory, a processor and a location information measurement implementation program stored in the memory and executable on the processor, wherein the location information measurement implementation program, when executed by the processor, implements the location information measurement implementation method of claim 3.

6. The location information measurement implementation method of claim 1, before sending the auxiliary positioning information to the terminal, further comprising:

obtaining the auxiliary positioning information from one of a core network element, a network management device, and a neighbor base station device.

7. An access network element, comprising:

a memory, a processor and a location information measurement implementation program stored in the memory and executable on the processor, wherein the location information measurement implementation program, when executed by the processor, implements the location information measurement implementation method of claim 6.

8. The location information measurement implementation method of claim 1, wherein the access network element comprises a base station.

9. An access network element, comprising:

a memory, a processor and a location information measurement implementation program stored in the memory and executable on the processor, wherein the location information measurement implementation program, when executed by the processor, implements the location information measurement implementation method of claim 5.

10. An access network element, comprising:

a memory, a processor and a location information measurement implementation program stored in the memory and executable on the processor, wherein the location information measurement implementation program, when executed by the processor, implements the location information measurement implementation method of claim 1.

11. A location information measurement method, applied to a terminal, comprising:

receiving auxiliary positioning information sent by an access network element;

performing positioning measurement according to the auxiliary positioning information;

wherein the auxiliary positioning information comprises information on a positioning node, the positioning node comprises a Bluetooth node, and the information on the positioning node comprises a name of the Bluetooth node;

wherein the auxiliary positioning information comprises filtering indication information; and wherein the auxiliary positioning information further comprises a limit threshold for a number of positioning nodes reported by the terminal;

filtering the positioning nodes according to the filtering indication information, wherein Bluetooth nodes whose device names lack specific character strings are filtered out of the position nodes;

performing positioning measurement according to at least a subset of the positioning nodes obtained after the filtering; and sending, to the access network element, positioning measurement information of the terminal.

12. The method of claim 11, wherein the access network element comprises a base station.

13. A terminal, comprising:

a memory, a processor and a location information measurement program stored in the memory and executable on the processor, wherein the location information measurement program, when executed by the processor, implements the location information measurement method of claim 12.

14. A terminal, comprising:

a memory, a processor and a location information measurement program stored in the memory and executable on the processor, wherein the location information measurement program, when executed by the processor, implements the location information measurement method of claim 11.

* * * * *